Nov. 7, 1961     I. W. RUDERMAN     3,008,045
NEUTRON DETECTION
Filed Feb. 18, 1957     4 Sheets-Sheet 1
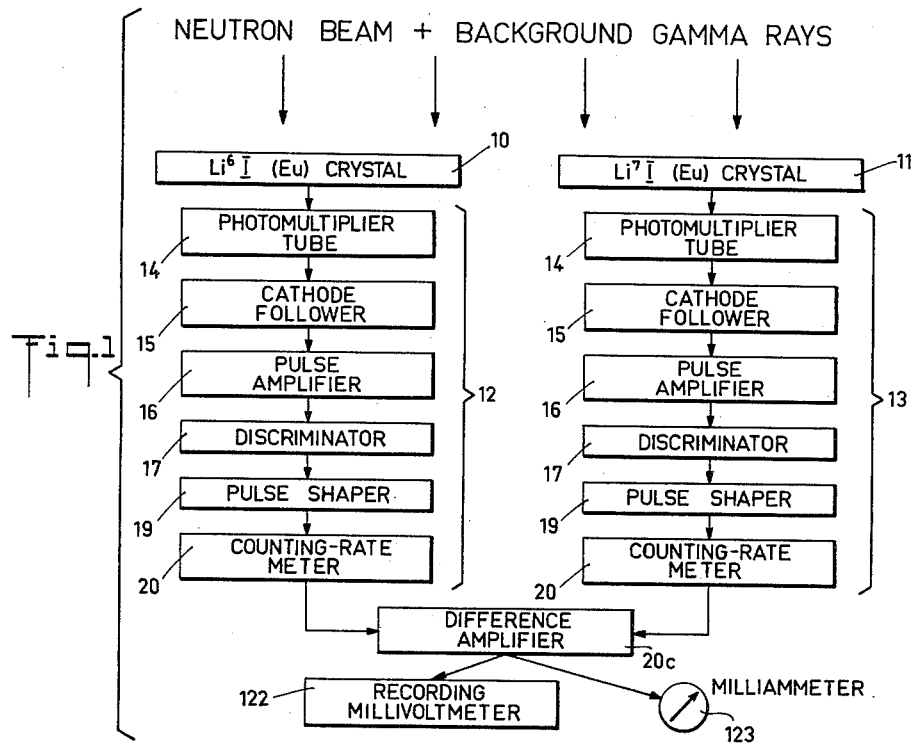
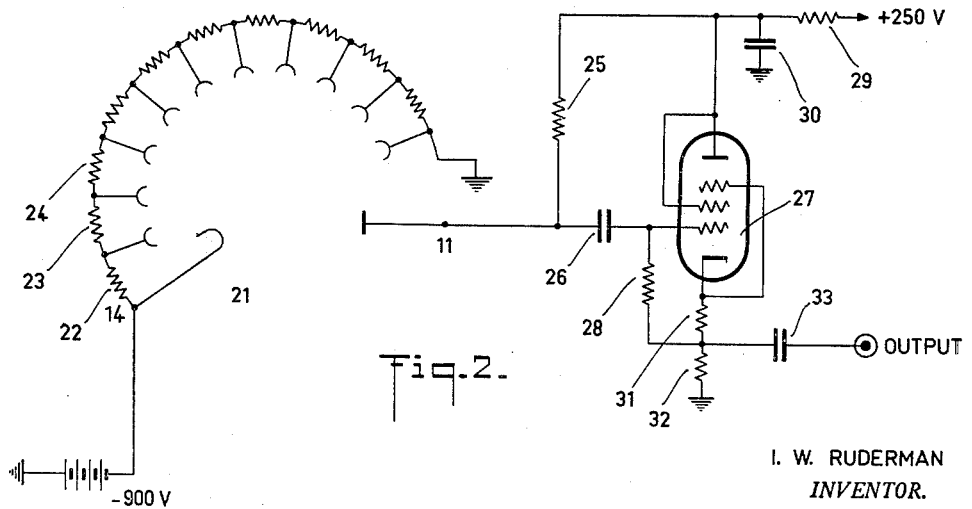
I. W. RUDERMAN
INVENTOR.
BY
J. W. Schmied
ATTORNEY Nov. 7, 1961  I. W. RUDERMAN  3,008,045
NEUTRON DETECTION
Filed Feb. 18, 1957  4 Sheets-Sheet 2

I. W. RUDERMAN
INVENTOR.

BY  *J. W. Schmied*
ATTORNEY

Nov. 7, 1961     I. W. RUDERMAN     3,008,045
NEUTRON DETECTION

Filed Feb. 18, 1957     4 Sheets-Sheet 3

I. W. RUDERMAN
*INVENTOR.*

BY *J. W. Schmied*
ATTORNEY

Nov. 7, 1961     I. W. RUDERMAN     3,008,045
NEUTRON DETECTION

Filed Feb. 18, 1957     4 Sheets-Sheet 4

DIFFERENCE AMPLIFIER AND RECORDER

I. W. RUDERMAN
*INVENTOR.*

BY  *J. W. Schmied*
ATTORNEY

3,008,045
NEUTRON DETECTION

Irving Warren Ruderman, Demarest, N.J., assignor to Isomet Corporation, Palisades Park, N.J., a corporation of New Jersey
Filed Feb. 18, 1957, Ser. No. 640,662
6 Claims. (Cl. 250—71.5)

This invention relates to means for and methods of detecting and counting neutrons and more especially for detecting and counting neutrons in the presence of other radiation such as gamma radiation.

It is known that neutrons occur in fields simultaneously with gamma rays. Methods of detecting and counting neutrons are known. It is an object of this invention to provide new and improved means for this purpose. The prior means and methods which are in use fall into three classes.

According to a first prior art method boron trifluoride gaseous counters are used. Their operation depends upon capture of a neutron by a boron nucleus with the resultant emission of an alpha particle. Ionization produced by the alpha particle when the gas is subjected to an electric field results in a detectable discharge. Boron trifluoride neutron counters are limited in efficiency and are of relatively large size. The efficiency in increasing the number of neutron counts may be increased by increasing the gas pressure of such devices to increase the number of boron atoms in a volume of gas of given cross section; this technique is limited by the resulting increase in sensitivity to gamma rays resulting from the large output pulses produced by two or more gamma rays producing scintillations simultaneously or so nearly simultaneously as to produce pulses having an overlapping effect.

According to another method ionization chambers filled with hydrogenous gas such as methane are used for counting neutrons; these also are lacking in sensitivity and are large in size.

According to another method use is made of scintillation counters employing an element having a high stopping power for neutrons. For example, lithium iodide crystals activated with europium or tin will scintillate upon being irradiated with neutrons. However, they will also scintillate under irradiation with gamma rays. The resultant scintillations in both cases produce electrical pulses in suitable photo-responsive tubes with attached amplifying equipment. These pulses may be separated to some extent by the use of pulse height analyzers but nevertheless the procedure is not completely satisfactory.

Therefore, objects of the invention are to provide improved methods of and instrumentalities for counting neutrons or measuring the neutron flux through a space of given cross section in the presence of other radiations especially in the presence of gamma radiation.

A further object is to provide methods of and means for counting or measuring the background radiation which accompanies neutrons within a given area or volume of space.

Other objects are to provide means for or methods of increased ease and simplicity for making records of neutron intensity.

In accordance with a preferred embodiment of the present method a novel means is used for counting neutrons in any radiation field which is uniform over a sufficient area or zone to enable one to submit two scintillating bodies to substantially equal an equivalent radiation. This is accomplished by providing two scintillating bodies one of which contains an element and the other an isotope of that element which is substantially equally sensitive to gamma rays and/or electrons but much more sensitive to neutrons.

Thus, one crystal may be composed of lithium consisting chiefly of $Li^6$ which has a high cross section for neutrons whereas the other consists chiefly of $Li^7$ which has a low cross section for neutrons. The stopping power or capture of neutrons corresponds in general to the cross section. These crystals are made otherwise as nearly identical as possible and may be activated with known activators such as europium. For example, one crystal may be made of normal isotopic lithium which contains about 7.5 percent of $Li^6$ and about 92.5 percent of $Li^7$. Lithium has been produced which is high in $Li^6$. For example, lithium iodide is available which contains 95 percent $Li^6$ and 5% $Li^7$.

By employing such pairs of crystals in a radiation field, and associating with them apparatus to obtain a differential effect and of a kind which may be calibrated properly and by subtracting the neutron rate of the crystal or other phosphor which is insensitive to neutrons from the counting rate of the crystal or phosphor which is sensitive to neutrons one may determine not only the neutron counting rate but also the background radiation intensity.

Any pair of phosphors or scintillators which are otherwise suitable may be used provided they contain adequate quantities of elements which are isotopes having respective high and low neutron cross-sections.

Whereas, $Li^6$ and $Li^7$ are suitable, one also could use boron-containing scintillators. The scintillating materials need not necessarily be solid but could be liquid or in other suitable form. Thus, typical scintillators could consist of xylene to which has been added 1% of p-terphenyl, .02% of terphenylbutadiene and enough trimethylborate to saturate. In one case the boron used is $B^{10}$ and the other $B^{11}$.

It is not essential that isotopes of identical elements be used. For example, one phosphor could be composed of lithium iodide activated with europium of which the conventional symbol is $Li^6I(Eu)$ and the neutron insensitive crystal could be $NaI(Tl)$ i.e., thallium activated sodium iodide. When such crystals of dissimilar elements are used the associated circuits hereinafter referred to and described must be adjusted to have equal outputs when exposed to gamma rays of equal intensity.

Apparatus associated with the pair of phosphors may assume various forms, a typical exemplary form is disclosed herein and will be described in connection with the accompanying drawings, wherein:

FIG. 1 is a block diagram of the entire exemplary system;

FIG. 2 is a circuit diagram of a typical photo-multiplier tube and cathode follower repeater;

Figure 3:
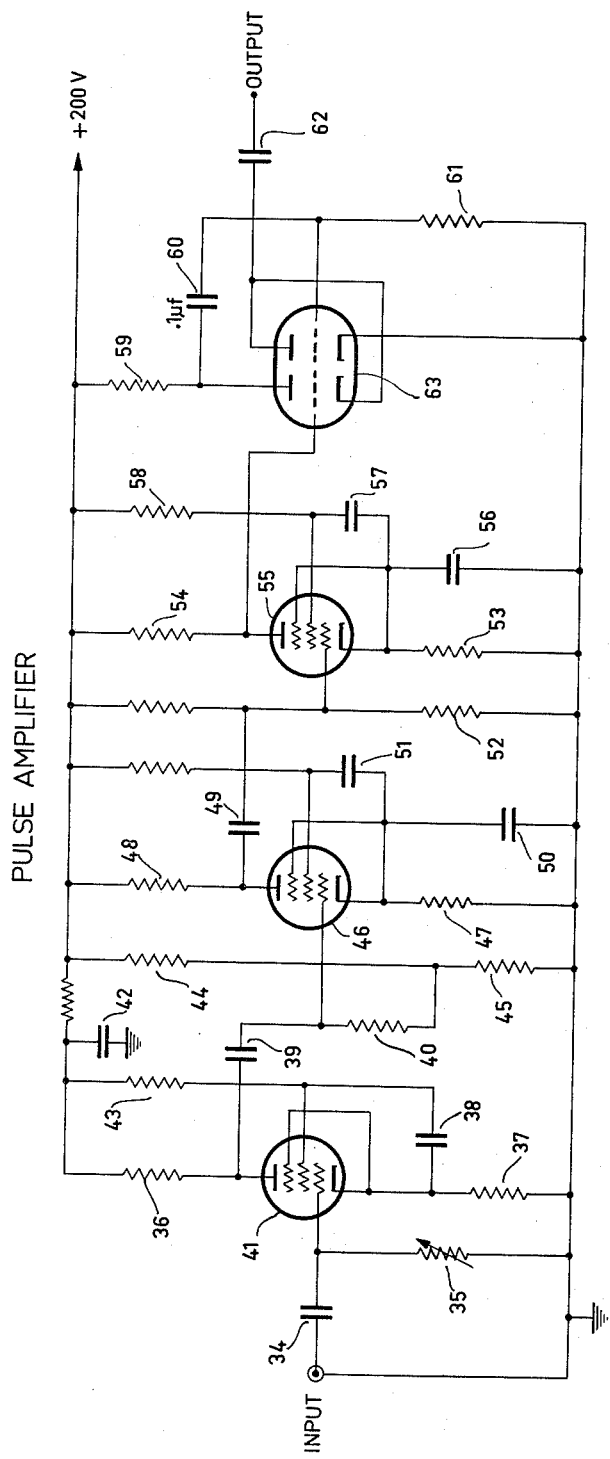
FIG. 3 is a circuit diagram of a typical pulse amplifier.

In FIG. 1 the arrows directed downwardly from the top signify a field of radiation consisting of neutrons and gamma rays which is to be investigated.

Side by side and as nearly together as possible are the two phosphor crystals, one containing $Li^6$ and the other chiefly $Li^7$. It is to be understood that the $Li^7$ crystal is natural lithium whereas that designated $Li^6$ contains much larger proportions of the $Li^6$ isotope.

These crystals are mounted next to the windows of and coupled to photo-multiplier tubes of a known kind which are available on the market.

The manner of coupling and mounting such crystals is known and suitable forms are disclosed in my U.S. patent application Serial No. 368,472 filed July 16, 1953, the disclosure of which is also included in British Patent 751,058, accepted April 16, 1956, hence no detailed description is necessary. The glass window of the mounted crystal is adapted to and placed face to face with the window of the photo-multiplier tube in the case of each crystal.

By way of illustrative example having values arbitrarily chosen for simplicity of calculation, assume a scintillating crystal 10 having 92.5 percent $Li^6$ and a crystal 11 having 7.5 percent of $Li^6$ and a count of 850. By applying the formula previously given the true neutron count for crystal 10 would be 925 and hence the count for crystal 11 would be 75. If then, the crystal 11 is exposed to the same neutron radiation plus background radiation the excess above 75 would represent the background radiation.

Each crystal or other phosphor 10 and 11 is connected to a tandem arrangement of electronic or equivalent devices such for example, as transistors having appropriate circuit arrangements to perform the functions herein outlined. The devices and circuits described are exemplary. The train 12 of devices may be and usually is identical with the train 13 although they are not necessarily identical and are not necessarily adjusted identically.

The photo-multiplier tubes 14 are known and, as set forth above, their manner of coupling to scintillating bodies is known. Their function is to receive flashes of light from the scintillators and create in response thereto corresponding pulses of current in their output circuits.

The function of the cathode follower circuits 15 is to respond to the pulses of current and create corresponding pulses of current and voltage in their respective output circuits for further amplification.

The function of the pulse amplifiers 16 is to create amplified pulses of voltage corresponding to those supplied by the cathode follower circuits. It is suitable if the voltage gain is of the order of 700.

The function of the discriminator 17 is to enable the suppression of all pulses below a certain amplitude which are supplied by the pulse amplifier. This eliminates small spurious pulses arising in the photo-multiplier tubes. These spurious pulses are commonly referred to as noise and background pulses. For this purpose the discriminator is provided with an adjustable input bias resistor hereinafter referred to. The discriminator supplies positive output pulses of the order of 40 volts.

Figure 4:
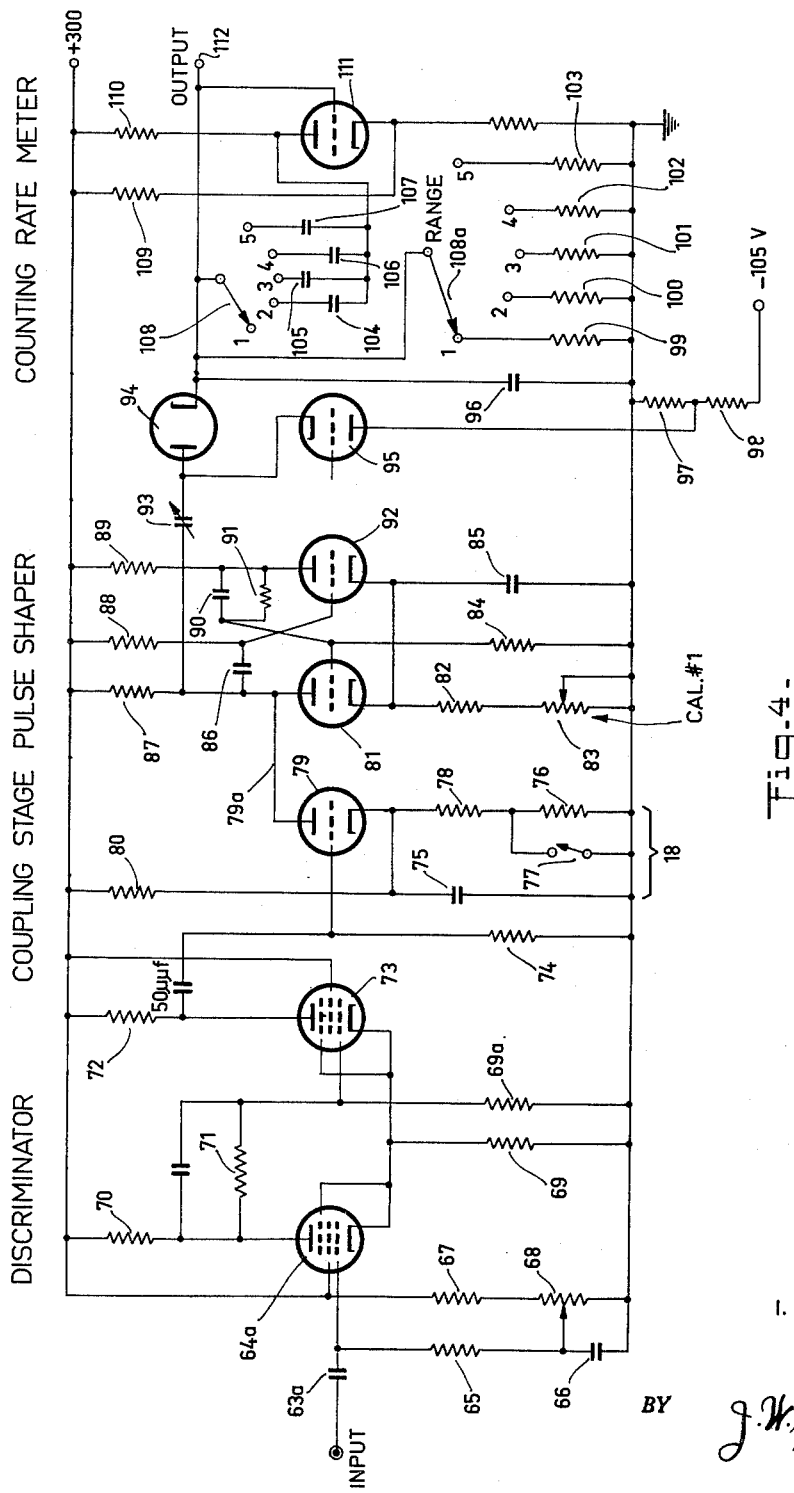
FIG. 4 is a circuit diagram of a discriminator and a pulse shaper, with a coupling stage between them, and a counting rate meter.
Figure 5:
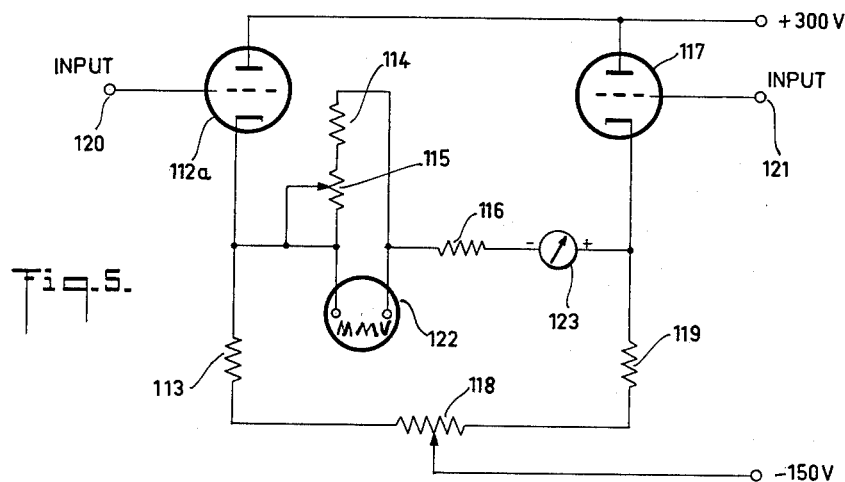
FIG. 5 is a circuit diagram of a difference amplifier including a recording milli-voltmeter and a milli-ammeter.

A coupling stage 18 between the discriminator and pulse shaper is not shown in FIG. 1. It is disclosed in FIG. 4 and its function is to couple the discriminator to the pulse shaper for more effective operation.

The function of the pulse shaper is to deliver to the counting rate meter a standard pulse. In other words every pulse received at its input results in a pulse of approximately uniform amplitude and duration in its output circuit, assuming of course that the output is not in the meantime disturbed by a closely following pulse. Each pulse is supplied to the input of an integrating circuit known as a counting rate meter.

The integrating circuit, designated a counting rate meter, is supplied with several input resistors of varying ohmic amplitude whereby several different ranges of counting rates are selectable. It is also supplied with several selectable capacitances whereby the probable error of the counting rate may be adjusted. The time required for an indication of a change in counting rate depends on the adjustment for the probable error selected for a given counting rate. In a rough way the lessening of the response time to a change in counting rate results in an increase of the probable error and an increase in response time decreases the probable error.

The difference amplifier 20c is essentially a vacuum tube voltmeter circuit in which the voltage due to the counting rate of the phosphor 11, $Li^7I(Eu)$, is subtracted from the voltage resulting from the counting rate of the phosphor 10, $Li^6I(Eu)$, and the difference is recorded on a recording millivolt meter 122 or indicated on a milliammeter 123.

The elements of the electronic circuits in a typical arrangement may be according to the following table:

21—a conventional photomultiplier tube
22, 23, 24, etc.—100,000 ohms
25—47,000 ohms
26—.01 microfarad
27—electronic pentode sold under code 6AK5
28—100,000 ohm resistor
29—5,000 ohms
30—4 microfarads
31—200 ohms
32—10,000 ohms
33—.01 microfarad
34—.01 microfarad
35—variable resistor having a maximum value of 100,000 ohms
36—1,500 ohms
37—130 ohms
38—.1 microfarad
39—.01 microfarad
40—470,000 ohms
41, 46 and 55—pentodes sold as 6AK5
42—8 microfarads
43—33,000 ohms
44—180,000 ohms
45—12,000 ohms
47—2,000 ohms
48—18,000 ohms
49—.01 microfarad
50—200 micromicrofarad
51—.1 microfarad
52—330,000 ohms
53—820 ohms
54—18,000 ohms
56—100 micromicrofarad
57—.1 microfarad
58—33,000 ohms
59—2,700 ohms
60—.1 microfarad
61—1 megohm
62—.01 microfarad
63—double triode sold as 12AT7
63a—.01 microfarad
64a and 73—pentodes sold as 6AC7
65—1 megohm
66—.01 microfarad
67—100,000 ohms
68—50,000 ohms variable resistor variable over its whole range
69—10,000 ohms
69a—50,000 ohms
70—5,000 ohms
71—100,000 ohms
72—5,000 ohms
74—50,000 ohms
75—.01 microfarad
76—50,000 ohms
77—zero check switch, normally closed
78—10,000 ohms
79—one set of triodes of six-element tube 6SN7
80—150,000 ohms
81, 92—double triode sold as 6SN7
82—10,000 ohms
83—variable calibrating resistor, 1,000 ohms
84—100,000 ohms
85—.01 microfarad
86—50 micromicrofarads
87—10,000 ohms
88—1 megohm 89—10,000 ohms
90—40 micromicrofarads
91—200,000 ohms
93—variable condenser
94, 95—diodes sold as 6H6
96—.03 microfarad
97—1,000 ohms
98—50,000 ohms
99—200,000 ohms
100—500,000 ohms
101—1 megohm
102—2 megohms
103—5 megohms
104—.002 microfarad
105—.02 microfarad
106—.25 microfarad
107—1.0 microfarad
108—probable error switch
108ª—range switch
109—250,000 ohms
110—250,000 ohms
111—one-half of double triode sold as 6SN7
112—output terminal
112ª—one-half of double triode sold as 6SN7
113—150,000 ohms
114—4 megohms
115—calibrating resistor variable up to 2 megohms
116—1,250 ohms
117—triode of tube 6NS7
118—calibrating resistor, 10,000 ohms with variable contact
119—15,000 ohms
120—input terminal to be connected to output terminal of counting rate meter 20 fed by scintillator 10
121—input terminal to be connected to output terminal of rate meter 20 fed by scintillator 11
122—known type of recording milli-volt meter
123—milliammeter Those skilled in the art will understand the design, construction, and mode of operation of the devices of FIGS. 2, 3, 4, and 5 from the drawings and the foregoing description without further explanation.

The calibration of the instruments of FIGS. 1 to 5 inclusive will now be described.

With the train 13 of instruments deenergized place a radioactive source consisting of radioactive cobalt Co⁶⁰ in front of the crystal of train 12 and at a fixed distance therefrom. Adjust the amplifier 15 until the pulses supplied to the discriminator are approximately 10 volts upon the input. The amplifier is adjusted by varying the resistor 35 to a suitable value between some low minimum value and its maximum of 100,000 ohms.

Disconnect the input to the discriminator from the amplifier and substitute a source of pulses of 10 volts or somewhat more from a signal generator. Set the signal frequency of the signal generator at 1,000 cycles per minute and the range switch 108a of the counting rate meter at an arbitrarily chosen point which may be designated 1,000 counts per minute.

Decrease the input bias of the discriminator by varying the position of the tap on resistor 68 until the counting rate no longer increases. The position of the tap on resistor 68 determines the minimum magnitude of pulse supplied to the coupling stage 18. At a certain adjustment all the test pulses from the test generator will be delivered to the coupling stage tube 79 and thereby affect the counting rate. As the bias is further decreased the rate does not change; the point of adjustment at which the increase ceases is the desired point. The indicator of the meter 123 is now adjusted to zero by opening the zero check switch 77 and then with switch 77 closed the meter 123 is adjusted to full scale by means of the tap on the adjustable resistor 115. The recorder 122 is adjusted to the maximum scale by means of the adjustable tap on resistor 118.

The input to the train of devices 12 is disconnected and the same procedure is followed with the train 13 as is described above with respect to the train 12.

Thereafter the input from the signal generator is fed equally into the "Input" of the discriminators of both the trains of devices 12 and 13 and the adjustable tap or resistor 118 is adjusted until both the recorder 122 and the milliammeter 123 read zero.

By operating switch 108 to connect larger capacitances the response of the instrument to variations in counting rate is decreased but the probable error is decreased and vice versa. It may be adjusted to any desired position.

The switch 108a selects one of the resistors 99, 100, 101, 102 whereby a different range of counting rates may be selected.

From any reading the neutron count may be calculated. Thus if the percentage of Li⁶ in crystal 10 be designated A, that in crystal 11 be designated B, and the indicated count is C, the true neutron count T of crystal 10 may be determined by the formula $$T = \frac{CA}{A-B}$$

The fundamental basis of the invention is comparison of the scintillations in two crystals which respond equally to gamma rays but unequally to neutrons. Whereas the specific circuits for doing this are advantageous variations in them may be employed.

Figure 6:
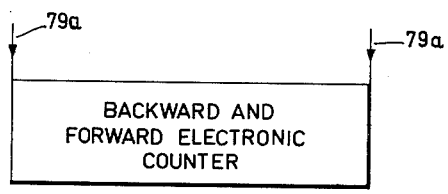
FIG. 6 is a diagrammatic indication of a modification in which a binary counter is used which adds pulses arriving over one input path and substracts pulses arriving over another input path.

Thus, there are known in the electronic art binary counters which count forward on pulses supplied to one input lead and count backward or subtract on pulses supplied to another input lead. A disclosure of a counter of this type is found in Holden Patent 2,583,102 dated January 22, 1952. Such a counter may have one input lead connected to the output conductor 79a of the coupling stage of train 12 (see FIGS. 4 and 6) and the other to the corresponding conductor of the coupling stage of coupling stage of train 13. Such an arrangement is diagramed in FIG. 6 where the backward and forward binary counter 124 has two inputs 79a, one from the coupling stage of train 12 of devices and the other from the coupling stage of train 13. A direct count may thus be obtained and the number of neutron counts calculated therefrom.

Furthermore, the counts from each train of devices may be recorded separately and then compared by subtraction.

In case the neutron beam is small in area and well collimated which may be true in the case of a certain type of nuclear reactor it may be necessary or advisable to place one crystal 10 directly in the beam for a given time and register the results and then place the other crystal 11 in the beam in an identical position for an identical time, record the results and then to compare the two records to determine the average neutron intensity.

They may be alternated in position at frequent equal intervals of time.

The total counting rate or average intensity of all background radiation other than neutrons can be also determined by the instrument described. To do this one switches off the output from the neutron sensitive crystal 10 and measures the counting rate from the neutron insensitive crystal 11. If the latter has some sensitivity to neutrons as would be the case if the neutron insensitive crystal contains normal lithium which has 7.5 percent of Li⁶ then one would subtract the neutron containing rate from the total counting rate of the neutron insensitive crystal. The neutron counting rate of the neutron insensitive crystal can be calculated from the total neutron counting rate determined as hereinbefore explained.

If pure isotopes are available they may be used but ordinarily they will not be pure and appropriate allowance must be made. Ordinarily the purity or percentage of different isotopes must be known within the required degree of accuracy.

The exemplary nature of the circuits of FIGS. 2 to 5 inclusive requires special emphasis as an almost unlimited number of modifications, additions or omissions may be made in these and nevertheless provide apparatus to carry out the main objects of the invention.

The embodiments of the invention in which an exclusive property or privilege is claimed are defined as follows:

1. A system for counting neutrons in the presence of other nuclear radiation comprising a first phosphor consisting of a certain proportion of an isotope of an element and a proportion of another isotope of the same element having a greater stopping power for neutrons than the first isotope, a second phosphor of substantially identical size, shape and chemical constitution except that the proportions of the said isotopes are widely different than in the first phosphor, a chain of devices coupled to each phosphor, each said chain comprising a light responsive device coupled to receive light from its respective phosphor, electronic repeater means including pulse amplifying means, pulse amplitude discriminator means and pulse shaper means, and a pulse responsive means coupled to the output of each said chain, said responsive means being coupled to said chains oppositely whereby the effect of pulses transmitted over one chain is the opposite of pulses transmitted over the other chain whereby a difference effect is indicated.

2. A system according to claim 1 wherein the element is lithium and the isotope of low stopping power for neutrons in the phosphors is $Li^7$ and the element of high stopping power is $Li^6$.

3. A system according to claim 1 wherein the element is boron and the isotope of low stopping power is $B^{11}$ and the other isotope of high stopping power is $B^{10}$.

4. A system according to claim 1 wherein the pulse responsive means comprises a counter which counts forward under control of pulses transmitted over one said chain and backward under control of pulses transmitted over the other chain.

5. A system for counting neutrons in the presence of other nuclear radiation comprising a first phosphor consisting of a certain proportion of an isotope of an element and a proportion of another isotope of the same element having a greater stopping power for neutrons than the first isotope, a second phosphor of substantially identical size, shape, and chemical constitution except that the proportions of the said isotopes are widely different than in the first phosphor, each phosphor having a device coupled thereto in light receiving relation to respond to light pulses by producing electrical pulses, each said device being coupled to a pulse repeating chain of devices at the input of said chain, each chain being coupled oppositely at the output end thereof to an electrical pulse responsive device to produce a difference effect in said device, and adjusting means included in said chains whereby upon exposing said phosphors to equal sources of gamma rays equal but opposite outputs may be effective upon said pulse responsive device.

6. A combination according to claim 5 wherein said repeating means includes means for selecting a range of amplitudes of pulses and repeating them to the exclusion of another range, and means for transforming the pulses of selected range into repeated pulses of increasedly uniform amplitude and duration.

References Cited in the file of this patent

UNITED STATES PATENTS

| | | |
|---|---|---|
| 2,288,718 | Kallmann et al. | July 7, 1942 |
| 2,543,676 | Thayer et al. | Feb. 27, 1951 |
| 2,740,898 | Youmans | Apr. 3, 1956 |
| 2,785,314 | Grahame | Mar. 12, 1957 |
| 2,795,703 | Berlman et al. | June 11, 1957 |
| 2,862,106 | Scherbatskoy | Nov. 25, 1958 |
| 2,892,091 | Sawle | June 23, 1959 |

FOREIGN PATENTS

| | | |
|---|---|---|
| 732,893 | Great Britain | June 29, 1955 |

OTHER REFERENCES

Hofstadter et al.: "Gamma-Ray Measurements with NaI(Ti) Crystals," Physical Review, July 15, 1950, pages 389 to 391.

Muchlhause et al.: "Two Liquid Scintillation Neutron Detectors," Nucleonics, January 1953, pages 44 and 45.

Connally: "Two-Crystal Gamma-Ray Scintillation Spectrometer," Review of Scientific Instruments, June 1953, pages 458 and 459.

Stanford: "Fast Coincidence System . . . ," Review of Scientific Instruments, September 1955, pages 847 to 849.